(12) United States Patent
Ehrlich et al.

(10) Patent No.: US 7,292,402 B2
(45) Date of Patent: Nov. 6, 2007

(54) SYSTEMS AND METHODS FOR MULTIPASS SERVOWRITING WITH A NULL BURST PATTERN

(75) Inventors: Richard M. Ehrlich, Saratoga, CA (US); David Rutherford, San Jose, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 216 days.

(21) Appl. No.: 11/090,608

(22) Filed: Mar. 25, 2005

(65) Prior Publication Data

US 2006/0215306 A1  Sep. 28, 2006

(51) Int. Cl.
G11B 21/02 (2006.01)
G11B 5/09 (2006.01)
G11B 5/596 (2006.01)

(52) U.S. Cl. .................. 360/75; 360/48; 360/77.01
(58) Field of Classification Search .............. None
See application file for complete search history.

(56) References Cited

U.S. PATENT DOCUMENTS 6,738,205 B1 * 5/2004 Moran et al. ............. 360/17
2004/0123025 A1 * 6/2004 Chainer et al. ........... 711/112

* cited by examiner

Primary Examiner—William R. Korzuch
Assistant Examiner—Jason Olson
(74) Attorney, Agent, or Firm—Fliesler Meyer LLP

(57) ABSTRACT

Embodiments of the present invention enables the trimming and writing of servo bursts in a null burst servo pattern as multiple portions in multiple passes while still demodulating each of the servo bursts as a single burst to obtain PES. Alternatively, the servo bursts can be trimmed and written using different currents in different passes respectively so that a gap can be created in the radial direction between the servo bursts. This description is not intended to be a complete description of, or limit the scope of, the invention. Other features, aspects, and objects of the invention can be obtained from a review of the specification, the figures, and the claims.

15 Claims, 17 Drawing Sheets

SYSTEMS AND METHODS FOR MULTIPASS SERVOWRITING WITH A NULL BURST PATTERN

FIELD OF THE INVENTION

The present invention relates to servowriting processes, systems, and devices.

BACKGROUND

Advances in data storage technology have provided for ever-increasing storage capability in devices such as DVD-ROMs, optical drives, and disk drives. In hard disk drives, for example, the width of a written data track has decreased due in part to advances in reading, writing, and positioning technologies. More narrow data tracks result in higher density drives, which is good for the consumer but creates new challenges for drive manufacturers. As the density of the data increases, the tolerance for error in the position of a drive component such as a read/write head decreases. As the position of such a head relative to a data track becomes more important, so too does the placement of information, such as servo data, that is used to determine the position of a head relative to a data track.

DETAILED DESCRIPTION

Figure 1:
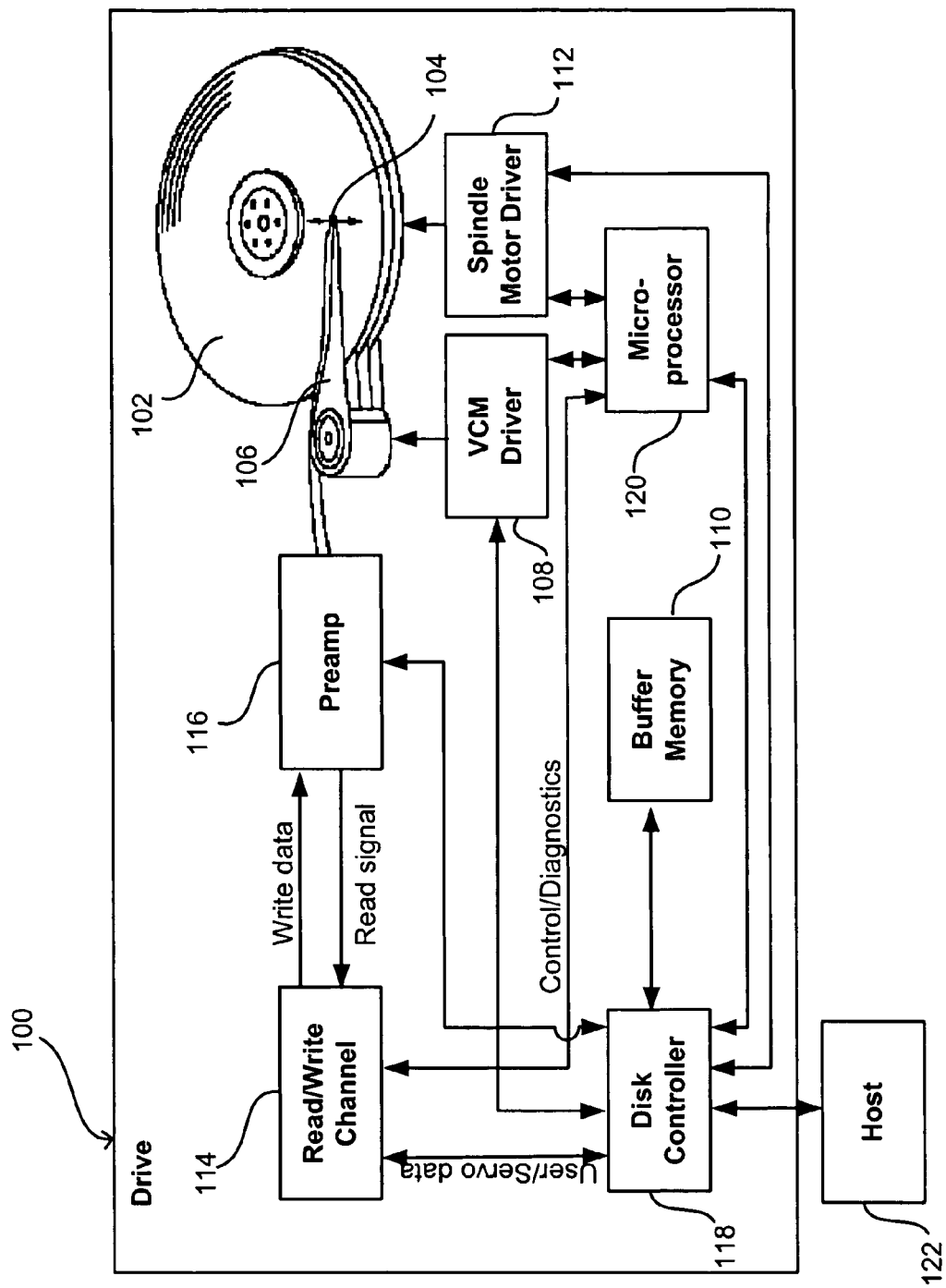
FIG. 1 is a functional diagram showing components of a disk drive that can be used in accordance with embodiments of the present invention.

Systems and methods in accordance with various embodiments of the present invention can be used when servowriting, or self-servowriting, a rotatable storage medium in a data storage device, such as a hard disk drive. For example, a typical disk drive 100, as shown in FIG. 1, includes at least one magnetic disk 102 capable of storing information on at least one of the surfaces of the disk. A closed-loop servo system can be used to move an actuator arm 106 and data head 104 over the surface of the disk, such that information can be written to, and read from, the surface of the disk. The closed-loop servo system can contain, for example, a voice coil motor driver 108 to drive current through a voice coil motor (not shown) in order to drive the actuator arm, a spindle motor driver 112 to drive current through a spindle motor (not shown) in order to rotate the disk(s), a microprocessor 120 to control the motors, and a disk controller 118 to transfer information between the microprocessor, buffer memory 110, read channel 114, and a host 122. A host can be any device, apparatus, or system capable of utilizing the data storage device, such as a personal computer or Web server or consumer electronics device. The drive can contain at least one processor, or microprocessor 120, that can process information for the disk controller 118, read/write channel 114, VCM driver 108, or spindle driver 112. The microprocessor can also include a servo controller, which can exist as an algorithm resident in the microprocessor 120. The disk controller 118, which can store information in buffer memory 110 resident in the drive, can also provide user data to a read/write channel 114, which can send data signals to a current amplifier or preamp 116 to be written to the disk(s) 102, and can send servo and/or user data signals back to the disk controller 118. A controller for the data storage device can include the disk controller 128 and/or processor 120. The controller can be on one or multiple chips. In one embodiment, a controller chip contains SRAM while DRAM and FLASH are external to the chip. Other memory arrangements can also be used.

Figure 2:
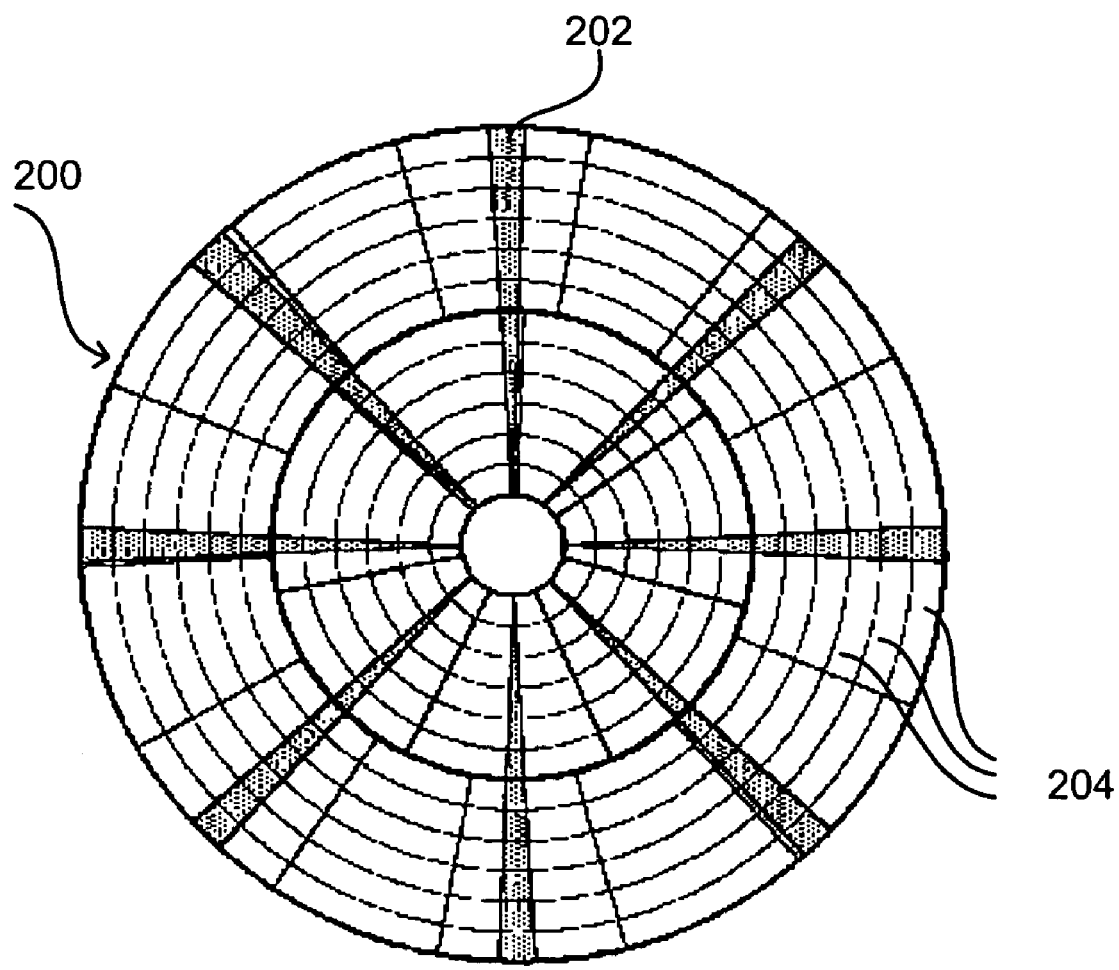
FIG. 2 is a diagram showing an example of a data and servo format for a disk in the drive of FIG. 1.

The information stored on disks can be written in concentric tracks, extending from near the inner diameter (ID) of the disk to near the outer diameter (OD) of the disk 200, as shown in the example disk of FIG. 2. In an embedded servo-type system, servo information can be written in servo wedges 202, and can be recorded on tracks 204 that can also contain data. In a system where the actuator arm rotates about a pivot point such as a bearing, the servo wedges may not extend linearly from the inner diameter of the disk to the outer diameter, but may be curved slightly in order to adjust for the trajectory of the head as it sweeps across the disk.

Figure 3:
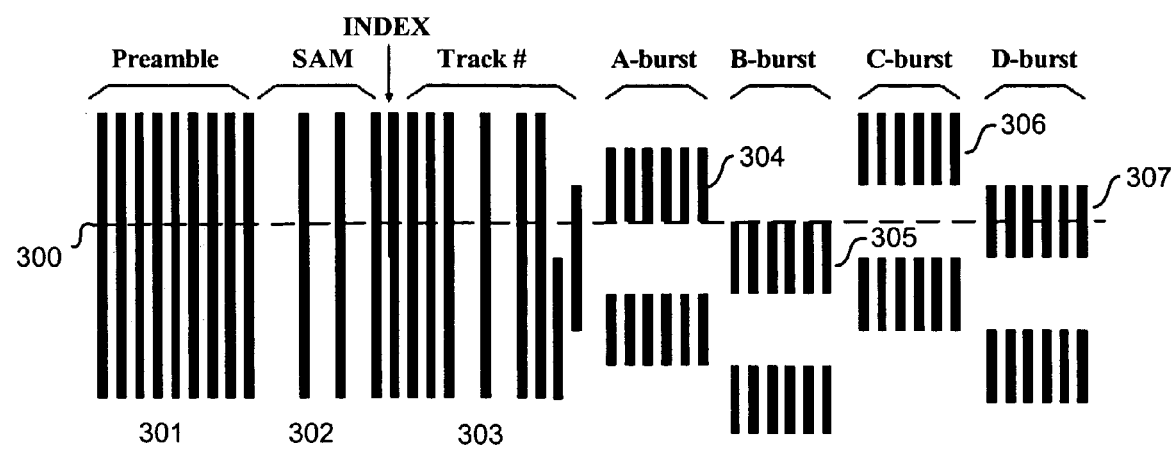
FIG. 3 (a)-(b) show exemplary 4-burst servo pattern and null burst servo pattern, respectively wherein servo information can be written to the tracks shown in FIG. 2.
Figure 3:
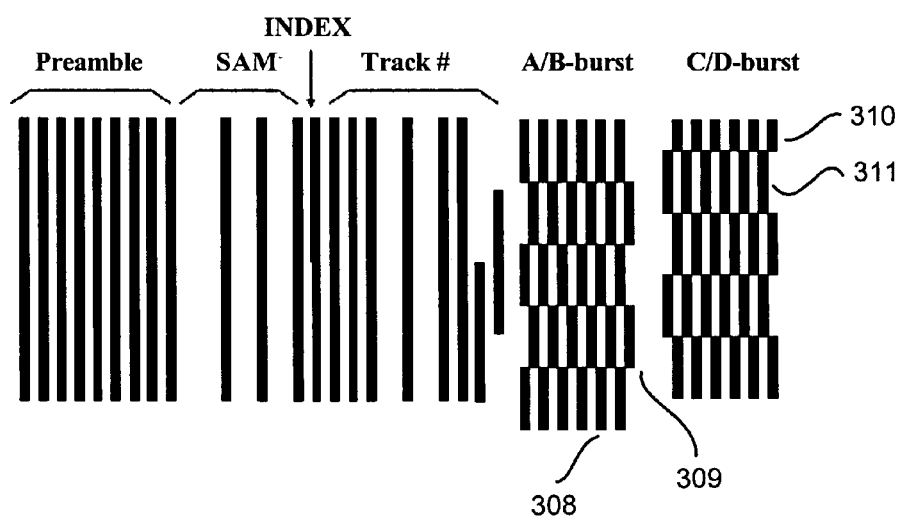

One example of a servo pattern is shown in FIG. 3 (a). That figure shows a radial extent of several servo tracks, and a circumferential extent of a single wedge. The shaded areas represent magnetic media that is magnetized in one direction, and the unshaded areas represent magnetic media that is magnetized in another direction (typically opposite to that of the shaded regions). In a longitudinal-recording system, the directions would be in the positive and negative circumferential directions (to the right and left in the figure). In a perpendicular-recording system, the two directions would be perpendicular to the media (in and out of the page in the figure). Both recording systems (longitudinal and perpendicular) can benefit from this invention.

Although the read-write head (often referred as a "R/W head") typically stands relatively still while reading and writing data, while the disk moves underneath it, it is often useful to visualize the head passing by regions of the disk as it reads or writes data from or to the disk. In the case of the servo patterns shown in FIG. 3, the head would first encounter the left-most patterns and move to the right across the servo-wedge (while of course, in reality, it is the head that stands still while the servo-pattern on the disk moves to the left). The R/W head first encounters the preamble 301, which is intended to allow the channel to acquire the correct sampling phase and amplification of the servo signal. Next, the R/W head encounters a SAM 302, or "Servo Address Mark". The SAM serves as a timing-mark, relative to which all subsequent information in the servo wedge can be located. Successful identification of the SAM also serves as an indication to the R/W channel that servo demodulation is proceeding properly. After the SAM, a servo wedge typically contains digital information about the radial and/or circumferential location of the wedge. In FIG. 3, a short track-number 303 is shown. The track-number typically specifies the general radial location of the wedge. Track-numbers are typically numbered sequentially, increasing either from ID (Inner-Diameter) to OD (Outer-Diameter), or vice-versa. The track-number shown in FIG. 3 contains only 4 bits, and can thus uniquely identify only 16 different tracks. Since a modern disk-drive may contain anywhere from 25000 to well over 100000 tracks, many more than 4 bits may be necessary to identify the track-number. FIG. 3 contains very few track-number bits primarily to allow easy illustration of a servo wedge. The track-number in a servo wedge is typically Gray-coded. Gray-coding of the track-number, as is known to those skilled in the art, ensures that only one bit of the gray-coded value changes from one track to the next. Thus, if the R/W head is between two tracks (as it often is), only one bit of the demodulated track-number might be indeterminate or ambiguous. A robust servo-demodulation scheme can deal with one ambiguous track-number bit.

It is important to note that the track-number identified by the track-number field is a servo-track-number (used, among other fields, by the servo to determine the radial location of the R/W head), which may be different from a data-track-number (which is used to identify a particular track of user-data). In some drives, there is a one-to-one correspondence between servo-tracks and data-tracks (that is, a given data-track may be associated with a servo-track of the same number, or a servo-track whose track-number is simply offset by a constant value from that of the data-track number). In other drives, a data-track may occupy a larger radial extent than that of a servo-track. A popular embodiment involves a ratio of 3/2 between data tracks and servo tracks. In such an embodiment, each data-track occupies the radial extent of 1.5 servo tracks. The translation from a requested data-track location to the corresponding servo track location for such a system might then be servoTrack= (1.5*dataTrack)+offsetTrack, where dataTrack is the requested data-track, servoTrack is the corresponding servo-track, and offsetTrack is an offset which can be used to place data-track #0 beyond servo-track #0 (typically, to allow the servo to safely operate slightly outside of the user data region). An example of such an embodiment is found in U.S. Pat. No. 5,600,506, by Baum et al., entitled "Apparatus and method for determining the position of a transducer relative to a disk surface in a disk drive system", which is incorporated herein by reference. It is also possible for a disk drive to use other relationships between servo and data tracks. One example of such a system can be found in U.S. Pat. No. 6,052,250, by Golowka et al., entitled "Disk drive with separately determined servo and data track pitch", incorporated herein by reference.

The servo patterns of FIG. 3 do not show any wedge-numbers. Typically, a servo wedge will have at least some indication of the circumferential location of the wedge, either in the form of a wedge-number included in each wedge, or an "index-mark", which identifies a single wedge out of all of the wedges of a track as an "index-wedge", or wedge #0. Wedges are typically numbered form 0 to N−1 (where N is the total number of servo-wedges on a track) going around the track in the order of encounter of wedges by the R/W head. This practice is well known to one of ordinary skill in the art. The wedge-number and/or index-mark are left out of the figures in this document to simplify the figures.

The servo information often includes bursts of transitions called "servo bursts". A boundary or burst boundary as used herein does not mean or imply that servo bursts forming a boundary necessarily have a substantially common edge as the bursts can be spaced such that there is a gap radially or circumferentially between the bursts. The servo information can be positioned regularly about each track, such that when a data head reads the servo information, a relative position of the head can be determined that can be used by a servo processor to adjust the position of the head relative to the track. For each servo wedge, this relative position can be determined in one example as a function of the target location, a track number read from the servo wedge, and the amplitudes and/or phases of the bursts, or a subset of those bursts. The number of bursts present in a servo wedge can vary from design to design, ranging from as few as one to as many as 6 or even more bursts in a single wedge. The position of a head or element, such as a read/write head or element, relative to a target or desired location such as the center of a track or other desired location, will be referred to herein as position-error. Position-error distance may be used to refer to the distance between a target or desired location and an actual or predicted location of a head or element. The signal generated as a head or element moves across servo bursts or boundaries between servo bursts is often referred to as a position-error signal (PES). The PES can be used to represent a position of the head or element relative to a target location such as a track centerline defined by a mathematical relationship between the amplitudes and/or phases of all of or any subset of the servo bursts.

FIG. 3 (a) shows an exemplary 4-burst servo pattern, which includes A-burst 304, B-burst 305, C-burst 306 and D-burst 308. A centerline 300 for a given data track can be "defined" by a series of burst edges or burst boundaries, such as a burst boundary defined by the lower edge of A-burst 304 and the upper edge of B-burst 305. If a read head evenly straddles the A-burst and the B-burst, then servo demodulation circuitry in communication with the head can produce equal amplitude measurements for the two bursts, as the portion of the signal coming from the A-burst above the centerline is approximately equal in amplitude to the portion coming from the B-burst below the centerline. The resulting computed PES can be zero if the track defined by the A-burst/B-burst (A/B) boundary is the center of a data track, or a track centerline. If the head is too far towards the outer diameter of the disk, or above the centerline in the figure, then there will be a greater contribution from the A-burst that results in a non-zero PES value, such as a "negative" PES. Using the negative PES, the servo controller could direct the voice coil motor to move the head toward the inner diameter of the disk and closer to its desired position relative to the centerline. This can be done for each set of burst edges defining the shape of that track about the disk.

The four bursts in the servo pattern can be written in multiple servowriting steps one burst at a time. After the first burst (e.g., 304) has been written in the first step of the servowriting process, each subsequent step writes one servo burst (e.g., 305) in a wedge and trims another (e.g., 304). Between servowriting steps, the servowriting head is stepped by one-half servo track radially, either toward the inner diameter (ID) or outer diameter (OD) of the disk, depending on the radial direction used to write the servo information. A seek typically takes anywhere from one quarter to one half of the time it takes for the disk to make one revolution. The process of writing the servo pattern for each step typically takes one or two full revolutions (passes) to write all of the wedges in that pass. It is possible that completing the burst writing and trimming for a single servowriting step can take more than two revolutions, but a maximum of two revolutions (one to write the new burst, and another to trim a previously-written burst) will be considered for the discussion below.

Using such an approach, servowriting can take about 1.25-2.5 revolutions per servowriting step. Since there are two servowriting steps per servo-track in this example, and 1.5 servo tracks per data-track, such a process requires 3 servowriting steps per data-track, or 3.75-7.5 revolutions per data-track. For purposes of subsequent discussion only, it will be assumed that the process takes 4 revolutions per data-track (a relatively low bound).

A disk drive can have tens of thousands of data tracks. With 100,000 data-tracks and a spin-speed of 5400 RPM (90 Hz), for example, the process would take 4,444 seconds, or about 75 minutes. If the process is carried out on an expensive servowriter, this can add substantially to the cost of the drive. Thus, drive manufacturers are motivated to use self-servowriting techniques to reduce or eliminate the time that a drive must spend on a servowriter.

Many self-servowriting techniques require considerably more than four disk revolutions per data-track written, as the drive must spend considerable time before each servowriting step determining the written-in runout of the corresponding reference track, so that the servowriting head can be prevented from following that runout while writing the final servo pattern. Techniques exist which allow tracks of servo information to be made substantially circular, despite the fact that the reference information is not perfectly circular. The information used to remove written-in runout from the track can be calculated in one approach by examining a number of parameters over a number of revolutions. These parameters can include wedge offset reduction field (WORF) data values calculated by examining the measured PES over a number of revolutions of a track, as well as the servo loop characteristics. A measurement can be made to characterize servo loop characteristics, which can be combined with the observed PES in order to determine the written-in runout of the reference track. Because the servo typically suffers both synchronous and non-synchronous runout (sometimes referred to in the industry as "repeatable" runout (RRO) and "non-repeatable" runout (NRRO), respectively), any measurement intended to determine the synchronous runout can be affected by the non-synchronous runout. If many revolutions of PES data are observed and combined (one possible approach to combine is to synchronously average the PES data, other possible approaches are outlined in U.S. Pat. Nos. 6,069,764, 6,437,936, 6,563,663 and 6,449,116), the effects of the non-synchronous runout can lessen, leaving substantially only synchronous runout. Observing many revolutions of PES data, however, can add significantly to the time required for determination of the written-in runout. Process engineers may need to balance the cost and benefit of additional revolutions of PES data collection in determination of WORF values.

FIG. 3 (b) shows an exemplary null burst servo pattern, which includes A-burst 308 and B-burst 309 are radially displaced from each other by one servo track at approximately the same space. C-burst 310 and D-burst 311 can be similarly written in quadrature with the A/B burst, i.e., it would have its center point at the same radial location where the A/B burst has a max or min value. Comparing to the traditional 4-burst servo pattern shown in FIG. 3(a), the null burst pattern is shorter in length and takes less space on the servo track.

For the embodiment shown in FIG. 3(b), the two bursts are typically demodulated via DFT (Discrete-Fourier Transform) processing of digitized, filtered samples of the signal from the R/W head as it passes over the bursts. When decoding the servo bursts, a drive system can use an algorithm that computes the real and imaginary parts of the DFT of the burst signal. Existing channels are capable of sampling the signal and doing a discreet Fourier transform. One such discreet Fourier transform that can be used is given as follows:

$$F_k = \sum_{n=0}^{N-1} f_n e^{-j2\pi k n/N}$$

Figure 4:
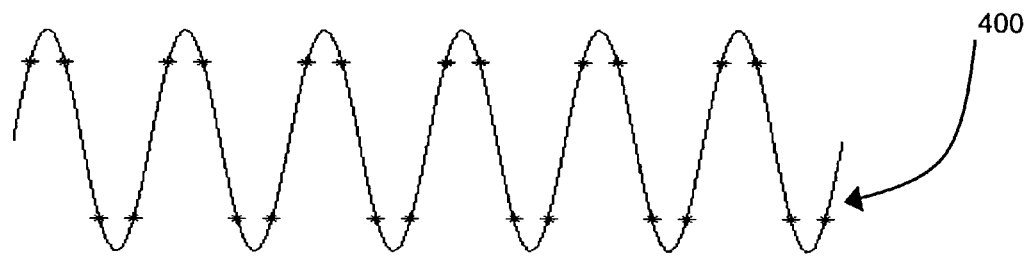
FIG. 4 (a)-(c) show possible sampling locations for DFT processing of burst signals.
Figure 4:
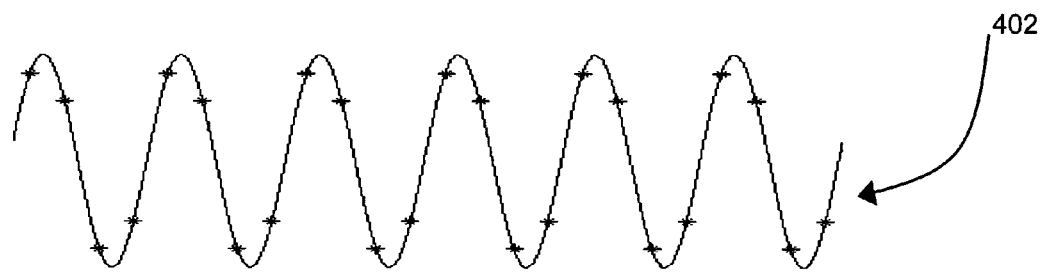
Figure 4:
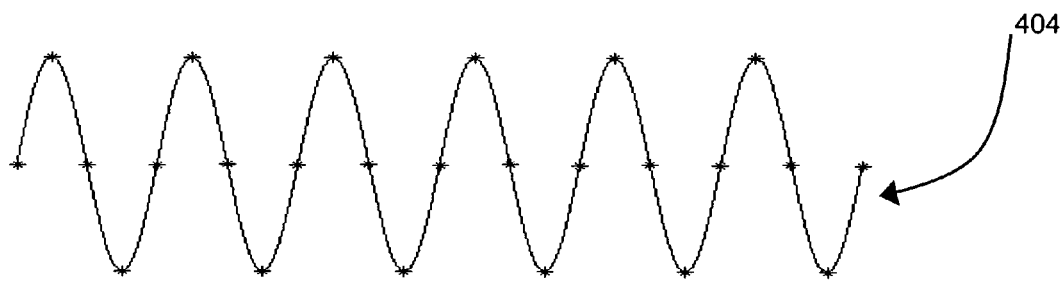

In this equation, $f_n$ is the sequence in time and $F_k$ is the Fourier component in frequency space. This "complex" math can be simplified in at least a few situations. For example, a signal can be examined at one quarter of the sample rate. In that case, the frequency-index, k, of interest would be k=M where M is the number of (approximately) sinewave cycles processed for each burst. For example, if the servo burst was 8 complete cycles in length (as is the case in FIG. 3), then a servo demodulation system might observe the middle 6 cycles (in order to avoid end-effects of the signal). In that case, the frequency-index of interest for the DFT of each burst signal would be k=6, so the above equation would be applied to determine the complex quantity, $F_6$. These samples can be taken at any appropriate location or interval, such as at or between signal peaks, etc. FIGS. 4 (a), 4 (b), and 4 (c) show example burst-signals with three different phases, relative to sample-times (each of which is marked with an "*" in those figures). The signal in FIG. 4B is slightly phase-advanced, relative to the one in FIG. 4 (a). The signal in FIG. 4 (c) is phase advanced relative to that in FIG. 4 (b). Even though the three signals are of the same amplitude, the difference in phases is reflected in the different resulting sample-values. Since the signals 400, 402, and 404 are examined at one quarter the sample rate, as shown in the figures, the DFT coefficients are all either +1, 0, or −1. In this case, the real part of the Fourier transform multiplies the signal by +1, 0, −1, 0, . . . and the imaginary part multiplies the signal by 0, +1, 0, −1 . . . , the imaginary part being offset by one sample from the real part. Therefore, each sample is adding to, subtracting from, or not affecting the result. An alternative approach is to use coefficients of +1, −1, −1, and +1 for the real part, and +1, +1, −1, −1 for the imaginary part, which can provide for greater immunity to noise since all samples will contribute to the sum. The resulting DFTs would all be phase-shifted by π/4 radians, relative to DFTs obtained using the +1, 0, −1, 0 (real part) and 0, +1, 0, −1 (imaginary part) coefficients, but as long as consistent post-processing of the resulting signals is used, this will not alter the resulting demodulated position. The discreet Fourier transform can then be reduced to an "adder" with no multiplication. A discreet Fourier transform of the signal then can be broken down into real and imaginary parts, which can each be squared and added together. The square root of this sum yields the magnitude of the signal. If the nominal sampling times of the bursts is as shown in 4 (a), and the alternative coefficients described above (+1, −1, −1, +1 for real part and +1, +1, −1, −1 for imaginary part) are used to process the signal, then the imaginary part of the DFT may be used to indicate the signed amplitude of the burst (which is useful in computing the PES for a null-burst pattern, as is described in U.S. Pat. No. 6,191,505, by Sacks et al., entitled "Synchronous Digital Demodulator with Integrated Read and Servo Channels"), and the real part of the DFT should be either zero or very small. If the nominal sampling times of the bursts is as shown in 4 (c), and the original coefficients described above (+1, 0, −1, 0 for real part and 0, +1, 0, −1 for imaginary part) are used, then the imaginary part of the DFT can again be used to indicate the signed amplitude of the bursts, and the real part would be expected to be either zero or very small. For other combinations of sampling times and DFT coefficients, a linear combination of the real and imaginary parts of the DFT can be used to indicate the signed amplitude of the bursts. For purposes of simplification in the descriptions below, it will be assumed that the nominal sampling times shown in 4 (a) are to be used, along with the alternative coefficients described above, so that the imaginary portion of the DFT of the sampled burst signal is a good indication of the signed amplitude of the bursts.

FIGS. 5(a)-5(d) depict the progression of several servowriting passes and steps of servowriting an exemplary null burst pattern, which is known in the art. The burst pattern is named "null" because there is no signal when the A-burst and B-burst (as described later) are straddled together and are 180 degrees out of phase with each other. Thus, only the signed amplitude (instead of either the absolute amplitude or the phase alone) of the real or imaginary parts of the DFTs of the burst signals or a combination of both the real and imaginary parts will be used to determine the demodulated position during demodulation of the pattern.

Figure 5:
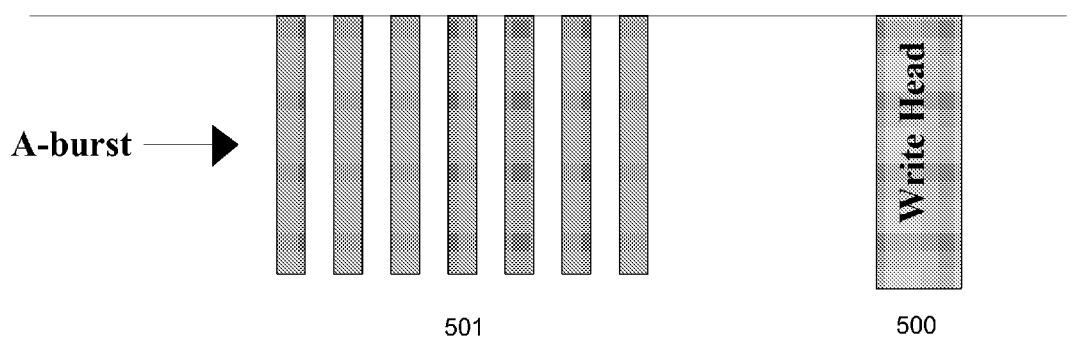
FIGS. 5 (a)-(d) are diagrams showing a progression of servowriting passes and steps of servowriting an exemplary null burst pattern.
Figure 5:
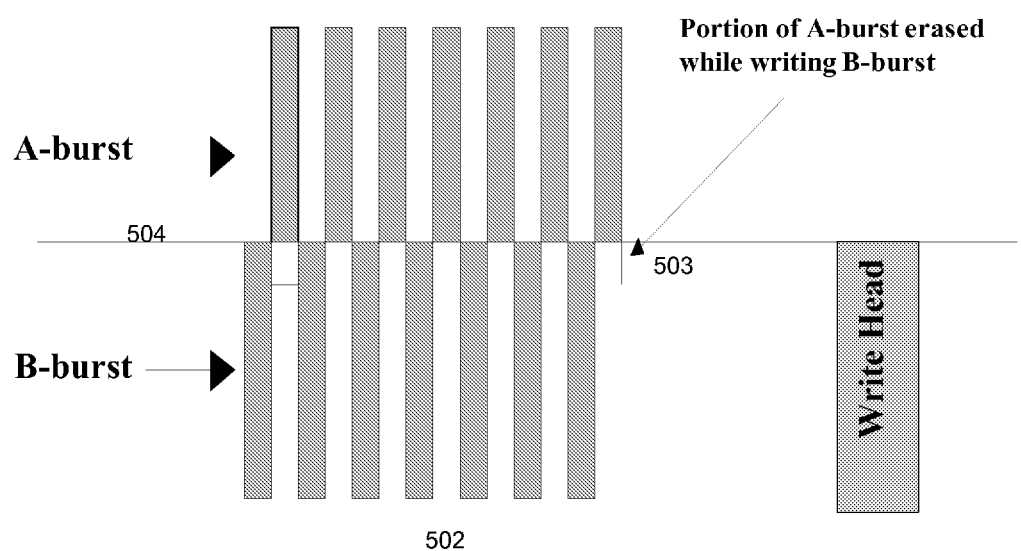
Figure 5:
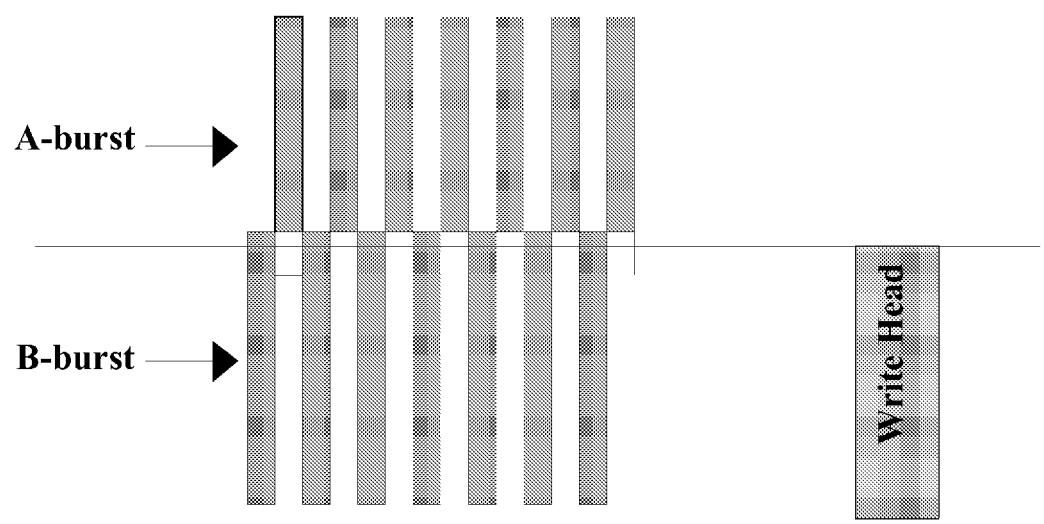
Figure 5:
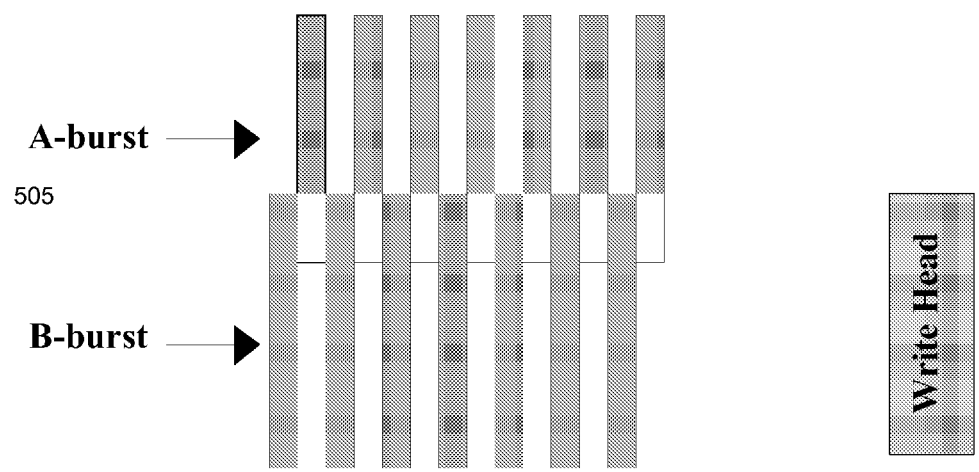

In FIG. 5 (a), the result of a single servowriting step is shown. From that step, the servowriting head 500 has written an exemplary A-burst 501. FIG. 5 (b) shows the result of the first pass in the second servowriting step by the servowriting head, which trimmed the A-burst and wrote a B-burst 502. 503 shows the portion of the A-burst that has been trimmed during this step and 504 is the boundary defined by lower edge of the A-burst and the upper edge of the B-burst. The B-burst is one servo track displaced radially from A-burst at the approximately the same place (and time slot), but is 180 degrees (or π radians) out of phase from the A-burst, where 360 degrees (or 2π radians) represents one (approximately) sinewave cycle of the signal. The advantage of such null pattern (compared to the bursts in FIG. 3) is that two bursts can be written in the space of one, so that more information can be stored with less noise on the disk. However, since trimming and writing operation are performed in a single pass at exactly the same time instead of separate passes, the "separate-trim-and-write" technique (as described in U.S. Pat. No. 6,519,107, by Ehrlich et al., entitled "Hard Disk Drive Having Self-Written Servo Burst Patterns") to reduce the written-in runout cannot be used. As a result, RRO will likely be much larger than it would be when two separate passes are used and randomized (averaged) due to the radial tracking errors present during the trimming and writing.

One way to resolve the high RRO issue is to write B-burst and trim A-burst twice in the same (second) servowriting step so that the RRO on two passes can be randomized. If the position of the write head in the second pass (of writing B-burst) is below where it was on the first pass, there is little impact on the B-burst already written as shown in FIG. 5 (c). If, however, the position of the write head in the second pass is higher than where it was on the first pass, as shown in FIG. 5 (d), the A-burst will be re-trimmed and the boundary 505 defined by A/B burst will be re-drawn as if the first pass of trimming and writing had never happened. Writing B-burst (and trimming A-burst) twice can reduce the average RRO significantly, but the RRO reduction will not be as large as that which would be obtained by averaging the position of two separate trim-write operations. In addition, the RRO distribution over many tracks on the disk may have a longer "tail" (of higher-RRO tracks), meaning that there will be a higher probability of occasionally having a track with large RRO.

Another way to resolve the large RRO issue was proposed by U.S. Pat. No. 6,049,442, by Fukushima et al., entitled "Multiply-written servo burst patterns for minimizing position error in servo disk drives", incorporated herein by reference. It advocates writing separate bursts at different passes to lower RRO. However, multiple sets of bursts have to be written and significant space between bursts is wasted.

Figure 6:
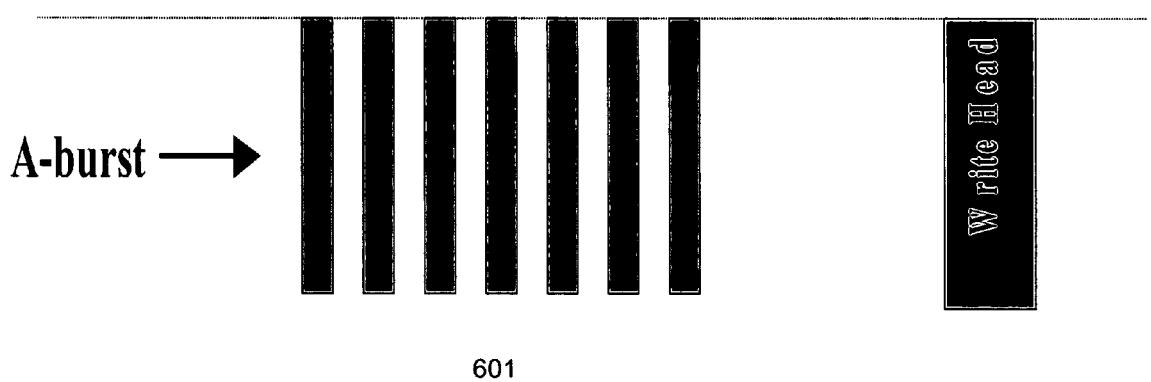
FIGS. 6 (a)-(d) are diagrams showing a progression of servowriting passes and steps of servowriting an exemplary null burst pattern in accordance with one embodiment of the present invention.
Figure 6:
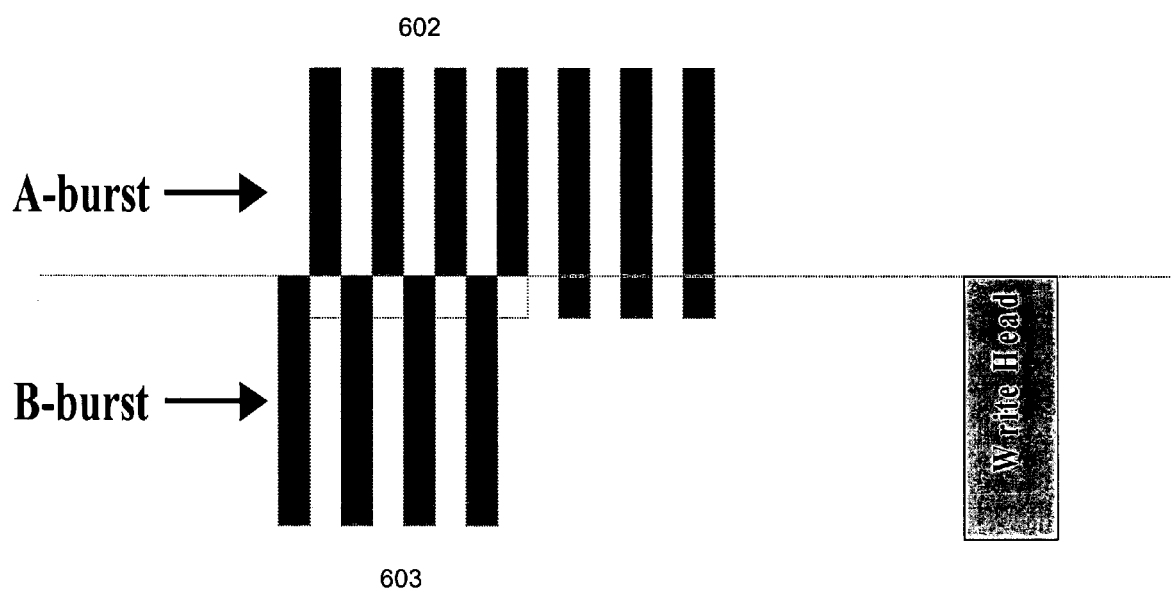
Figure 6:
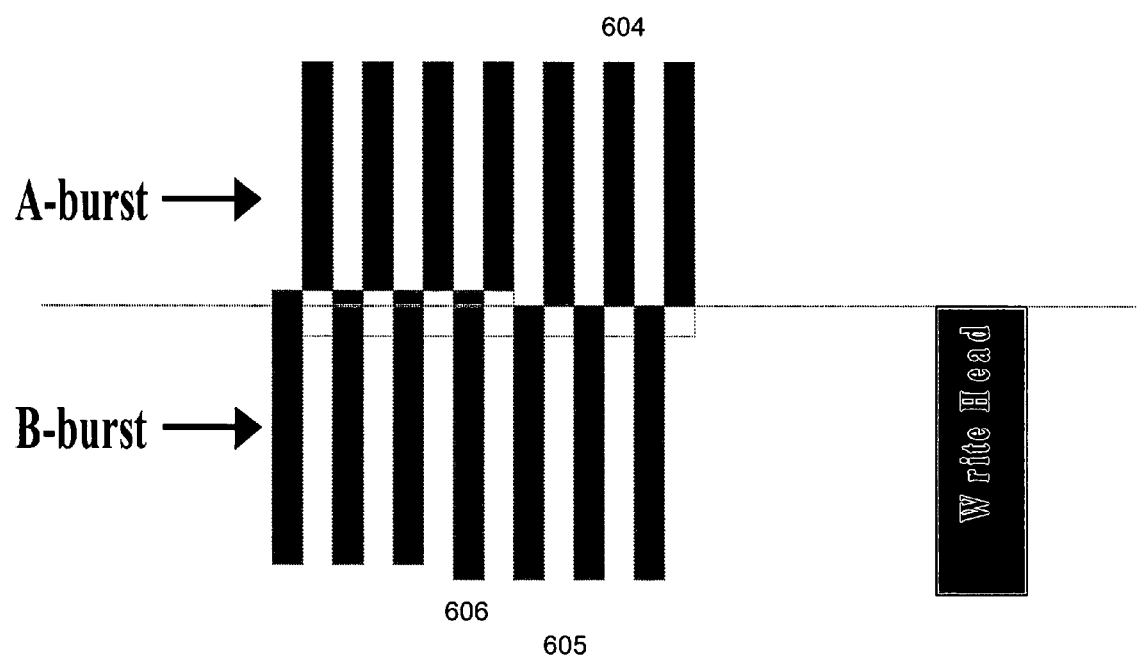
Figure 6:
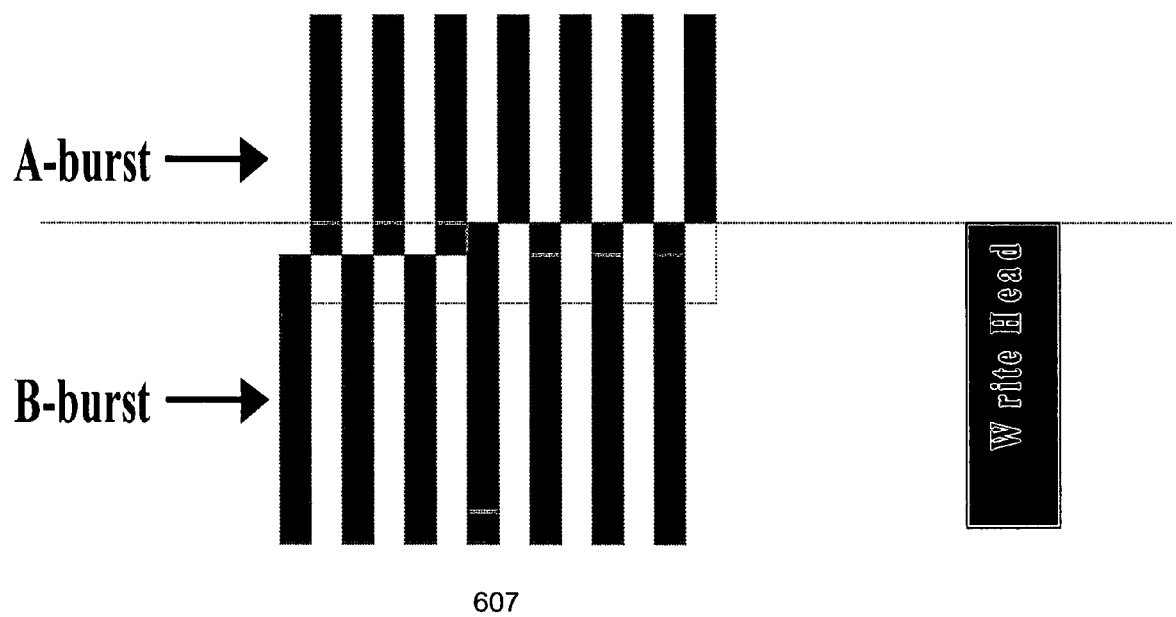

One embodiment of the systems and methods of the present invention, shown in FIG. 6(a)-(d), addresses the issues discussed above. A-burst 601 in FIG. 6 (a) is written in the first servowriting step in the exactly the same way as A-burst 501 in FIG. 5 (a). In the first pass of the second servowriting step, only a first portion (for example, half or slightly more than half) of, not the whole A-burst 602 and B-burst 603 are trimmed and written respectively in the same time slot, as shown in FIG. 6 (b). In the second pass of the second servowriting step, the second portion of the A-burst 604 and B-burst 605 are then trimmed and written respectively, as shown in FIG. 6 (c). If the position of the write head during the second pass is below where it was during the first pass, as shown in FIG. 6(c), the second portion of transition pairs (composed of A and B-bursts) will be affected except for the transition pairs 606 in the middle (which were trimmed/written during the first pass) that will remain intact. If the position of the write head during the second pass is above where it was during the first pass, as shown in FIG. 6(d), then all the second portion of transition pairs are affected including the transition pairs 607 in the middle. Since most of the transition pairs are trimmed and written only once either in the first pass or in the second pass in both cases (except the one or few transition pairs in the middle that are trimmed or written in both passes), the RRO distribution of the bursts will be similar to that by the "separate trim and write" approach without the "long tail" and the RRO of bursts written by the two passes can be randomized and better RRO can be obtained compared to the previous approaches. This idea can also be extended to more than two sub-bursts, as would be apparent to one of skill in the art.

Figure 7:
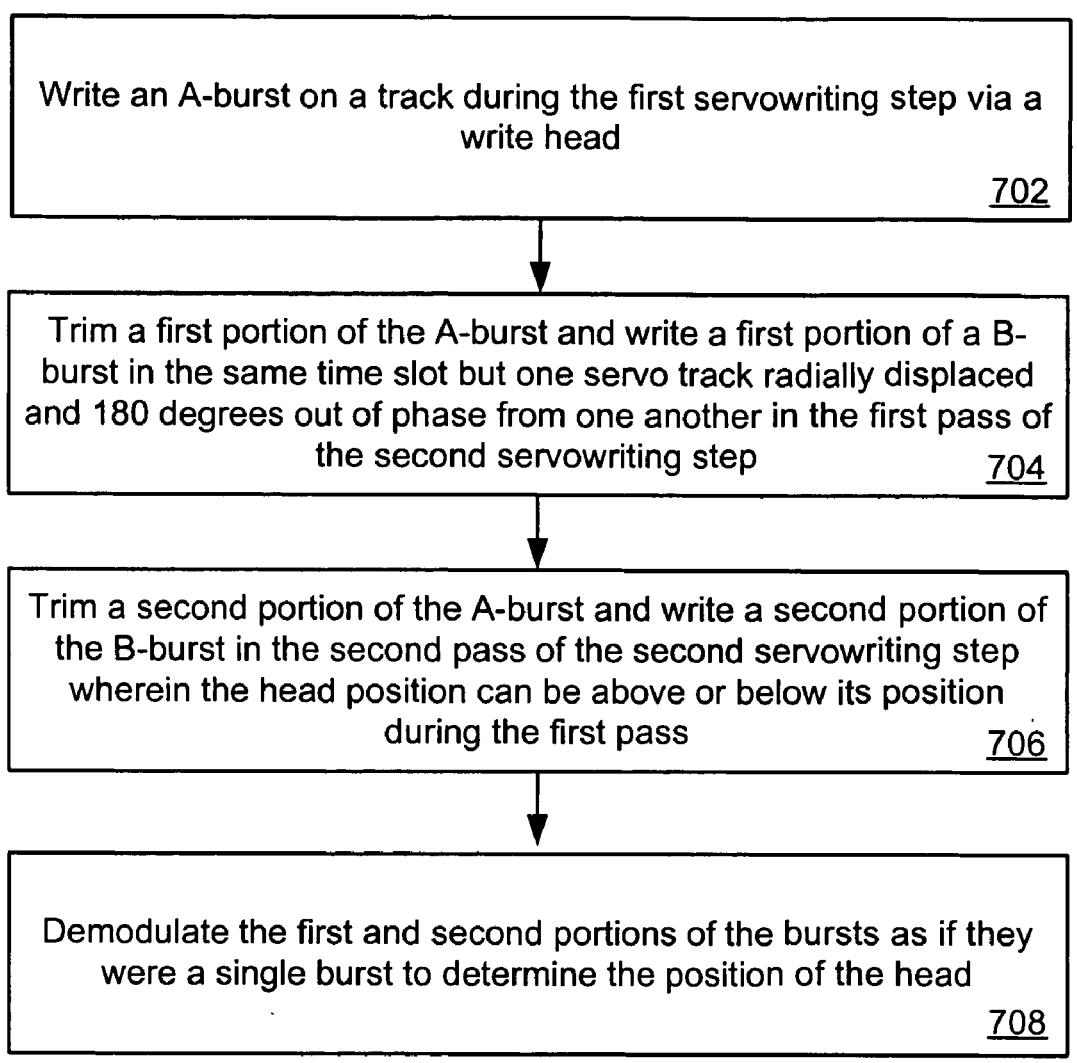
FIG. 7 shows the flow-chart which can be used to implement another embodiment of the present invention.

FIG. 7 shows a flow-chart that can be used for servowriting the null burst pattern in accordance with the present invention. Although only the servowriting of A and B-bursts is described in this and the following Figures, C and D-bursts can be handled in similar fashion, which is obvious to one of ordinary skill in the art. At step 702, an A-burst on a track can be written via a servowriting head during the first servowriting step. In the first pass of the second servowriting step, a first portion of the A-burst is trimmed and a first portion of a B-burst is written in the same time slot one servo track radially displaced and 180 degrees out of phase from the A-burst at step 704. In the second pass of the second servowriting step, a second portion of the A-burst is trimmed and a second portion of a B-burst is written at step 706, while the position of the write head may be slightly above or below where it was during the first pass of the second step. Plus, the first and second portion of A-burst and B-burst may overlap and some transition pairs may be written or trimmed twice. Finally, the first and second portions of the transition pairs of the bursts are demodulated as a single burst to calculate a PES at step 708. If it was possible to write/trim exactly half of the burst in each separate revolution, then this would be the best strategy. However, it would be better to overlap the write/trim operations than to leave some portion of the B-burst un-written and a corresponding portion of the A-burst un-trimmed (which could cause a large level of written-in runout). Thus, since it is impossible to write/trim exactly half of the burst in each operation, given the choice, it is better to overlap the operations than to "underlap" them.

Figure 8:
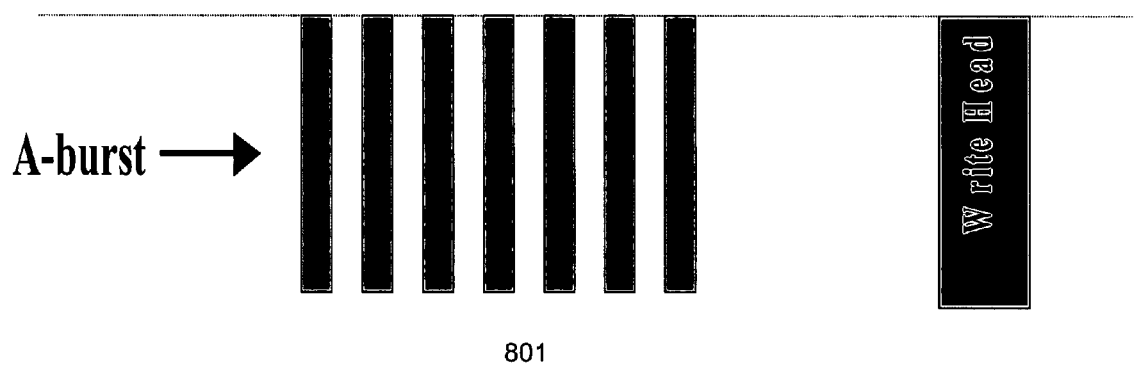
FIGS. 8 (a)-(c) are diagrams showing a progression of servowriting passes and steps of servowriting an exemplary null burst pattern in accordance with another embodiment of the present invention.
Figure 8:
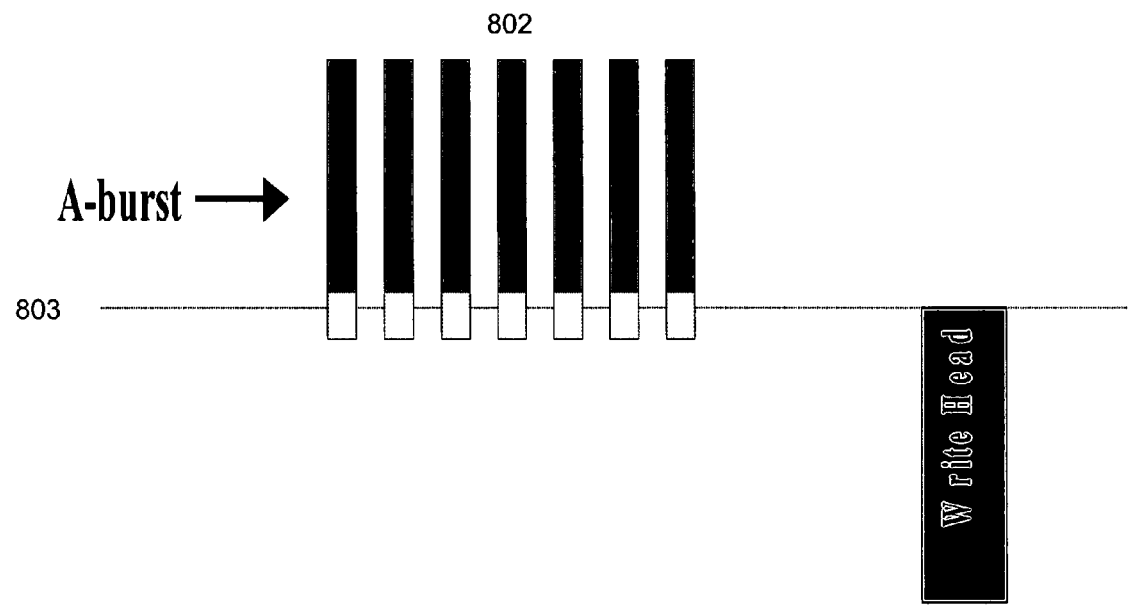
Figure 8C:
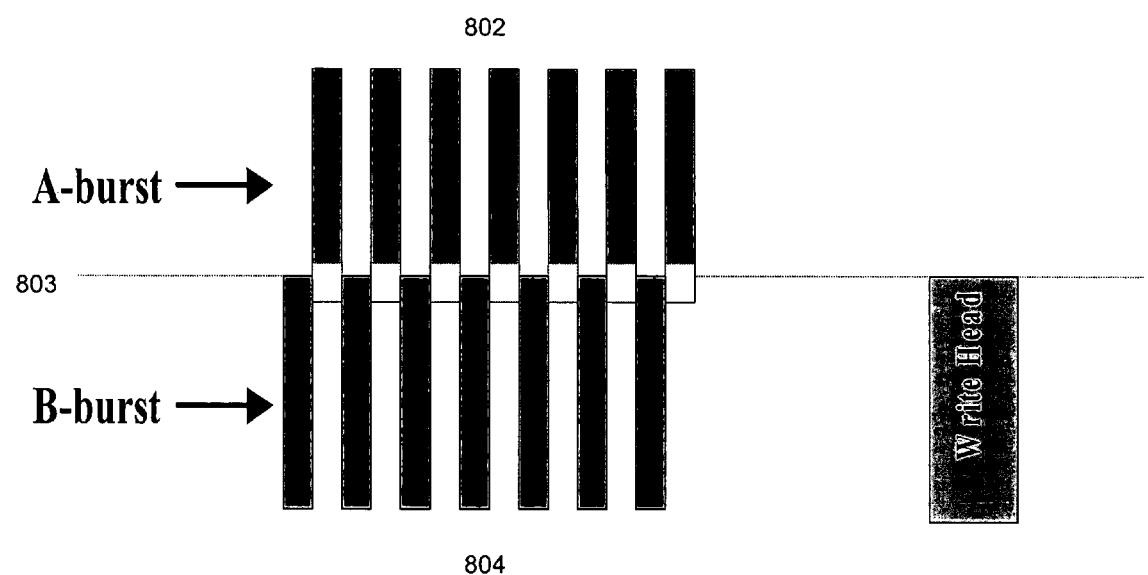

Another embodiment of the systems and methods of the present invention is shown in FIG. 8(*a*)-(*c*). Again, A-burst 801 in FIG. 8 (*a*) is written in the first servowriting step in the exactly the same way as A-burst 501 in FIG. 5 (*a*) and A-burst 601 in FIG. 6 (*a*). The first pass of the second servowriting step is a trimming-only pass on A-burst written in the first step. A higher erase current than what will be used for writing the B-burst in the next pass is used for the trimming, so that A-burst 802 will be erased higher up than the B-burst that is to be written next will extend, as shown in FIG. 8 (*b*). Note that because the higher write-current will result in a wider erase, the erasure of the A-burst extends above the horizontal line 803 that shows the position of the write head. In other words, the second servowriting step will trim higher than it will write later. In the second pass of the second servowriting step, a lower write current than the one just used is used to write the B-burst 804 at the horizontal line 803 one servo track radially displaced and 180 degrees out of phase from the A-burst, as shown in FIG. 8 (*c*). Such an approach intentionally creates a gap between the lower edge of the A-burst 802 and the upper edge of the B-burst 804, and as long as the difference between the erase and write currents on the two passes is sufficient to displace the corresponding trim and write edges by more than the potential "jitter" in the head position during writing, there will be a separately determined lower edge of the A-burst 802 and upper edge of the B-burst 804. Since the radial locations of the two edges should be relatively un-correlated, this approach will have the same advantage of typical "separate trim/write" approaches and it is capable of reducing the RRO of the tracks on the disk.

Figure 9:
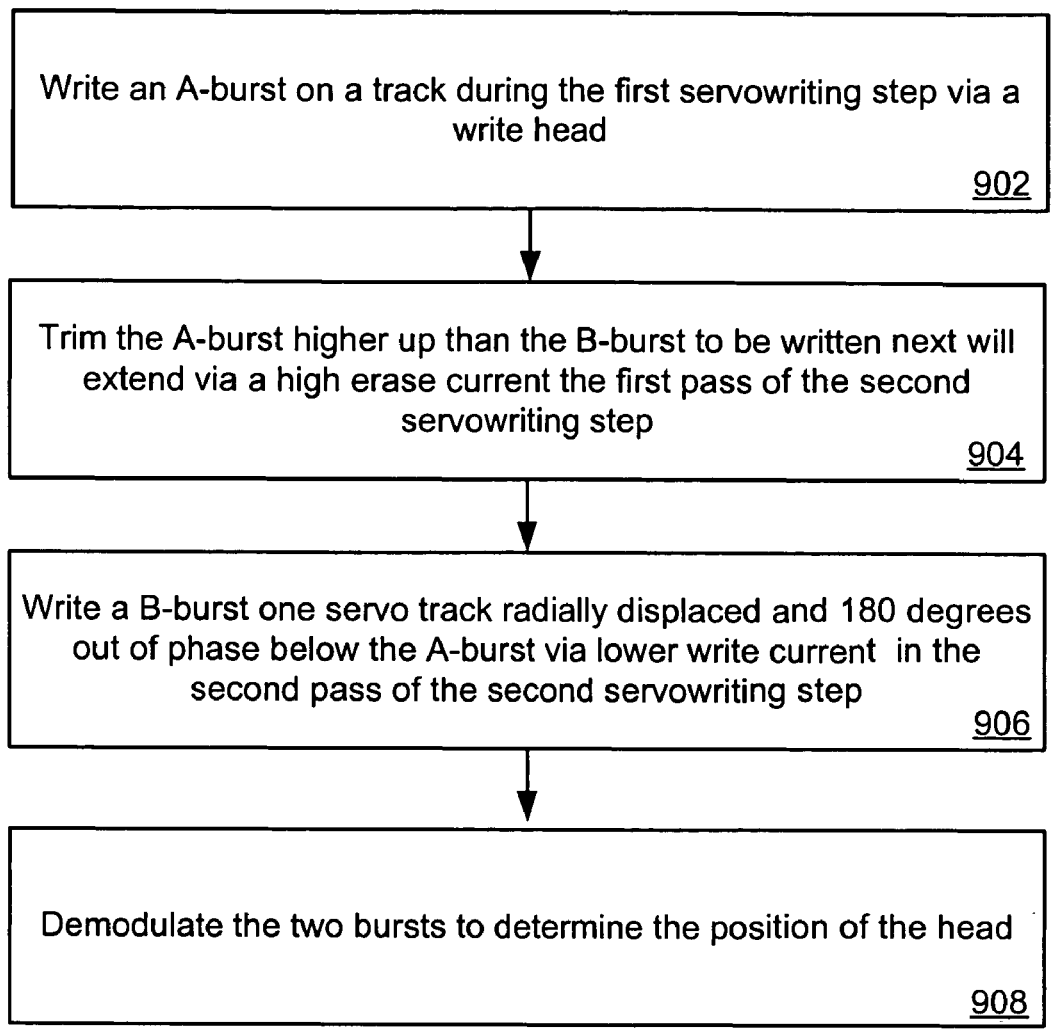
FIG. 9 shows the flow-chart which can be used to implement another embodiment of the present invention.

FIG. 9 shows a flow-chart that can be used for servowriting the null burst pattern in accordance with the present invention. An A-burst on a track can be written via a servowriting head during the first servowriting step at step 902. In the first pass of the second servowriting step, the A-burst is trimmed higher up than the B-burst that is to be written next will extend via a high erase current at step 904. In the second pass of the second servowriting step, a B-burst is written with a lower write current one servo track radially displaced and 180 degrees out of phase below the A-burst at step 906. As the result, there is gap between the separately determined upper edge of the B-burst and the lower edge of the A-burst. Finally, the two bursts are demodulated to calculate a PES and determine the position of the head at step 908.

Although embodiments described herein refer generally to systems having a read/write head that can be used to write bursts on rotating medium (magnetic media), similar advantages can be obtained with other such data storage systems or devices. For example, a laser writing information to an optical media can take advantage of additional passes when writing position information. Any media, or at least any rotating media in a single and/or multi-headed disk drive, upon which information is written, placed, or stored, may be able to take advantage of embodiments of the present invention.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed is:

1. A method for servowriting a null burst servo pattern on a surface of a rotatable medium using a head, comprising:
   positioning the head at a first radial position;
   writing a first servo burst in the null burst servo pattern
   positioning the head at a second radial position;
   trimming the first servo burst;
   writing a second servo burst in the null burst pattern while maintaining the head at the second radial position;
   wherein a radial gap is formed between the first servo burst and the second servo burst;
   demodulating the first and second servo burst as a single burst to obtain a position error signal.

2. The method according to claim 1, wherein
   the first servo burst and the second servo burst circumferentially overlap and are 180 degrees out of phase.

3. The method according to claim 1, further comprising:
   writing the first servo burst in a first servowriting step.

4. The method according to claim 1, further comprising:
   trimming the first servo burst in a first pass of a second servowriting step.

5. The method according to claim 1, further comprising:
   writing the second servo burst in a second pass of the second servowriting step.

6. The method according to claim 1, wherein:
   trimming the first servo burst further comprises applying an erase current to a write element of the head; and
   writing a second servo burst further comprises applying a write current to the write element of the head; and
   the erase current is higher than the write current.

7. The system of claim 1, wherein the gap is narrower than a width of a read element of the read/write head.

8. A system for servowriting a null burst servo pattern, comprising:
   a rotatable medium including a surface having a plurality of tracks to store the null burst servo pattern;
   a write head servowrite the null burst servo pattern; and
   a machine readable medium including instructions to:
      position the write head at a first radial position relative to a surface of the rotatable medium for servowriting;
      write a first servo burst in the null burst pattern using the write head;
      position the write head at a second radial position;
      trim the first servo burst using the write head;
      write a second servo burst in the null burst pattern using the write head while maintaining the write head at the second radial position;
      wherein a radial gap is formed between the first servo burst and the second servo burst; and
      demodulate the first and second servo burst as a single burst to obtain a position error signal.

9. The system according to claim 8 wherein:
the rotatable medium is one of a magnetic disk, an optical disk, and a laser-recordable disk.

10. The system according to claim 8, wherein:
the first servo burst and the second servo burst circumferentially overlap and are 180 degrees out of phase.

11. The method according to claim 8, wherein the instruction to trim the first servo burst further includes instructions to apply an erase current to a write element of the head; and
wherein the instruction to write a second servo burst further includes instructions to apply a write current to the write element of the head; and
wherein the erase current is higher than the write current.

12. The system of claim 8, wherein the gap is narrower than a width of a read element of the read/write head.

13. A system for servowriting a null burst servo pattern on a surface of a rotatable medium, comprising:
a read/write head including a write element;
a machine readable medium including instructions to:
position the write element at a first position over the surface;
write a first servo burst having a plurality of transitions in the null burst servo pattern;
position the write element at a second position overlapping the first position;
trim the first servo burst;
write a second servo burst having a plurality of transitions out of phase with the transitions of the first servo burst while maintaining the write element at the second position so that a gap is formed between the first servo burst and the second servo burst; and
demodulate the first and second servo burst to obtain a position error signal.

14. The system of claim 13, wherein the instruction to trim the first servo burst further includes instructions to apply an erase current to a write element of the head; and
wherein the instruction to write a second servo burst further includes instructions to apply a write current to the write element of the head; and
wherein the erase current is higher than the write current.

15. The system of claim 13, wherein the gap is narrower than a width of a read element of the read/write head.

* * * * *